Patented Sept. 15, 1931

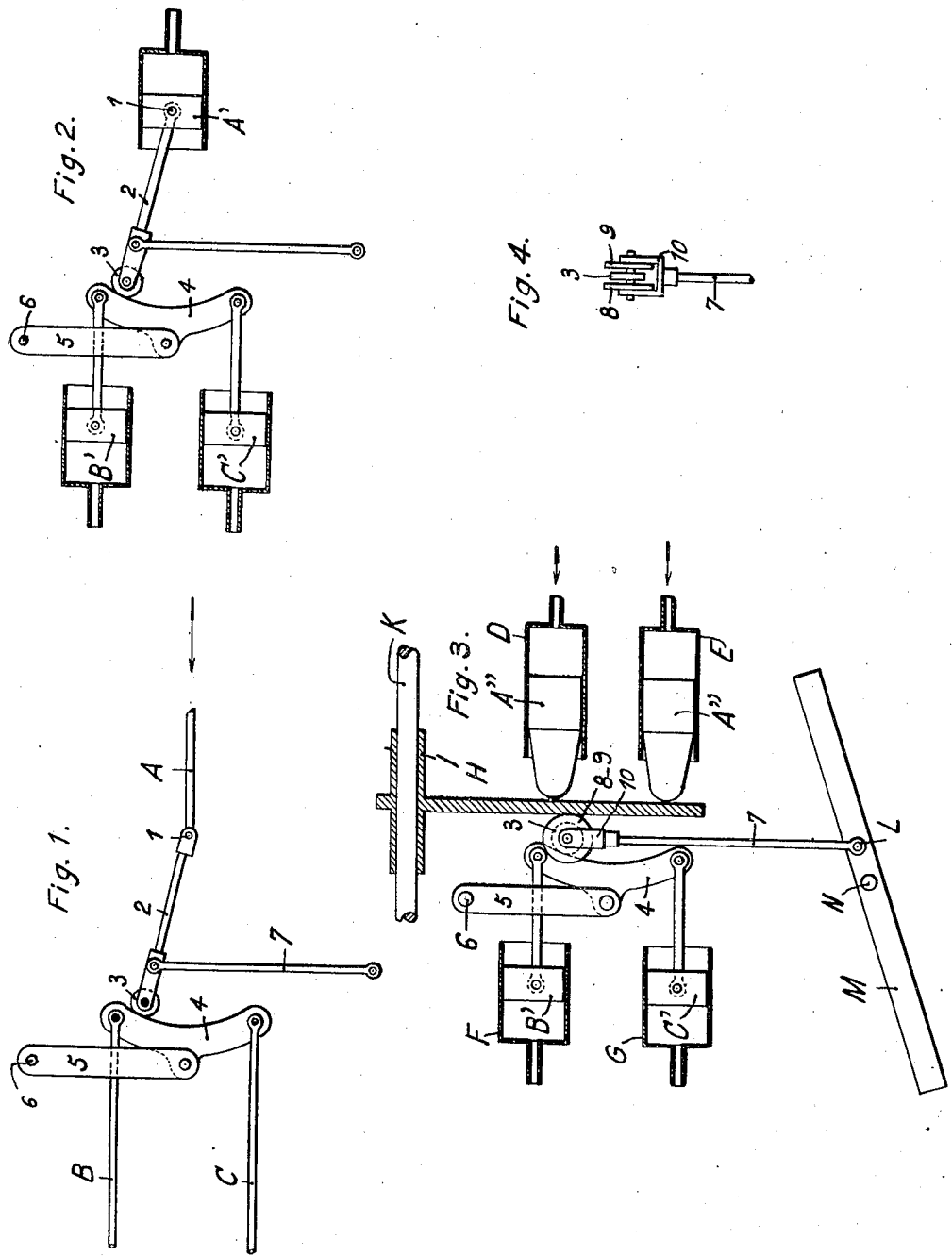

1,822,900

UNITED STATES PATENT OFFICE

GEORGE LOUIS RENÉ JEAN MESSIER, OF MONTROUGE, FRANCE

BRAKE-THRUST DISTRIBUTOR

Original application filed August 2, 1929, Serial No. 382,868, and in France August 10, 1928. Divided and this application filed June 9, 1931. Serial No. 543,064.

This application is a division of application Serial Number 382,868 filed August 2, 1929.

The present invention relates to a brake-thrust distributor intended for wheeled vehicles of all kinds and more particularly for distributing the braking action between the two wheels of an airplane's undercarriage.

The object of this invention is to provide a brake-thrust distributor allowing the driver of a vehicle to vary the intensity of the braking of a wheel relatively to the opposite one so as to facilitate the steering of said vehicle.

I attain this object by controlling the brakes of a wheeled vehicle by the intermediary of the distributing means illustrated diagrammatically in the accompanying drawings, in which:

Figure 1 shows a first embodiment of said distributing means intended to be interposed between a main braking lever A and a pair of rods B, C actuating the respective brakes of a corresponding pair of wheels of the vehicle.

Figure 2 shows a second embodiment of said distributing means intended to be interposed between the connecting rod of a main braking piston A' and a pair of secondary braking pistons B', C' actuating the respective brakes of a corresponding pair of wheels of the vehicle.

Figure 3 shows a third embodiment adapted for the braking of an airplane's undercarriage provided with the brake controlling device described in my parent application, Serial Number 382,868, from which the present application is a division.

Figure 4 is a detail of Figure 3 shown in side view.

In the first embodiment (Figure 1) the main braking lever A is articulated at 1 to a link 2 carrying a roller 3. Said roller rolls on a curved beam 4 interconnecting the two rods B, C, which actuates the respective brakes of a pair of wheels (not shown). The middle of said beam 4 is connected by a link 5 to a fixed pivot 6, secured to the body of the vehicle, so as to allow it to be shifted in the direction of the arrow, when a braking thrust is applied by the lever A, following a line substantially parallel to the direction of the lever A and of the rods B, C.

The displacement of the roller 3 along the curved concave side of the beam 4 is controlled by the intermediary of a connecting rod 7 connected to the steering device (not shown) of said vehicle in such a manner that the roller 3 is normally located in abutting relation with the middle of the beam 4 when the vehicle moves in a straight line.

In this normal position, each brake-thrust applied by the rod A is divided by the means according to the invention 1 to 7 in two equal stresses which are separately transmitted by the rods B, C to the two wheels of the vehicle. Therefore the braking is at this moment equal on each of said wheels.

The connection of said rod 7 with the steering device is devised in such a manner that the roller 3 is automatically shifted toward the left end of the beam 4 when the vehicle turns to the right or inversely, in order that, if the driver then applies the brakes, the braking action is stronger upon the wheel rotating at a higher speed than upon the opposite wheel describing the inner curve, due to the variations then occurring in the leverage.

In the second embodiment (Figure 2) the lever A and the rods B, C of Figure 1 are replaced by the pistons A', B', C' of three fluid pressure transmission devices.

In the third embodiment, the distributing means 3 to 7 of the invention are interposed between the main cylinders D, E and the secondary cylinders F, G of the fluid-pressure braking device of the undercarriage of an airplane, provided with the brake controlling device described in my parent application, Serial Number 382,868. The braking action varies according to the number of main cylinders (two of which only are shown) in which the fluid under pressure is admitted and is transmitted from the active plunger pistons A'', working in said cylinders, to the distributing roller 3 by the intermediary of a plate H, integral with a socket I, slidably mounted on a guide K. secured to the undercarriage of the airplane, and of two rollers 8, 9 of same diameter, rolling on said plate and freely mounted on the axis of the distributing roller 3. The diameter of said latter is smaller than the diameter of said rollers 8, 9.

The connecting rod 7 is provided at one end with a fork 10, carrying the axis or shaft of the rollers 8, 3, 9 and is pivoted at its other end to a suitable point L of the usual bar M, pivoted at N which controls the rudder of the airplane.

The above described embodiments are given by way of example only, all the details of construction and execution can be varied without departing thereby from the principle of the invention.

What I claim is:

1. Brake-thrust distributor of the divided beam type for wheeled vehicles, comprising a divided beam connected by each of its two ends to the brakes disposed on each side of the vehicle and linked by its middle to a fixed point of the chassis of the vehicle so as to swing around said fixed point in a direction substantially parallel to that of the braking thrust and means controlled by the steering device of the vehicle, for varying the ratio of division of said beam according to the position of said steering device.

2. Brake-thrust distributor of the divided beam type for two wheel vehicles, comprising a divided curved beam connected by its two ends to the respective brakes of said two wheels and pivoted at its middle to a link, pivotally mounted on the chassis of the vehicle, so as to swing around the fixed pivot of said link in a direction substantially parallel to that of the braking thrust, means for applying the primary braking thrust at an adjustable power point upon the concave curved side of said beam and means, controlled by the steering device of the vehicle, for varying the position of the power point of application of the primary braking thrust according to the position of said steering device.

3. Brake-thrust distributor of the divided beam type for airplane's undercarriage, comprising a divided curved beam connected by its two ends to the respective brakes of the two wheels of said undercarriage and pivoted by its middle to a link pivotally mounted on the chassis of said undercarriage so as to swing around the fixed pivot of said link in a direction substantially parallel to that of the braking thrust, a roller carried at the free end of a link articulated to the means transmitting the primary braking thrust and kept in abutting relation with the concave curved side of said beam by said means and a rod pivoted to said last link and mechanically connected to the rudder bar of the airplane so as to vary the position of said roller on said concave surface of the beam according to the position of said rudder bar.

4. Brake-thrust distributor of the divided beam type for airplane's undercarriage, comprising a divided curved beam connected by its two ends to the respective brakes of the two wheels of said undercarriage and pivoted by its middle to a link pivotally mounted on the chassis of said undercarriage so as to swing around the fixed pivot of said link in a direction substantially parallel to that of the braking thrust, a roller carried at the free end of a link pivoted to the rudder bar of the airplane, and kept in abutting relation with the concave curved side of said beam, by the means transmitting the primary braking thrust, by the intermediary of a plate movable parallelly to itself in a direction parallel to that of the braking thrust and of a pair of rollers of same diameter carried on the same axis of the first mentioned roller on both sides of said latter and rolling on said plate.

GEORGE LOUIS RENÉ JEAN MESSIER.